Figure 1:
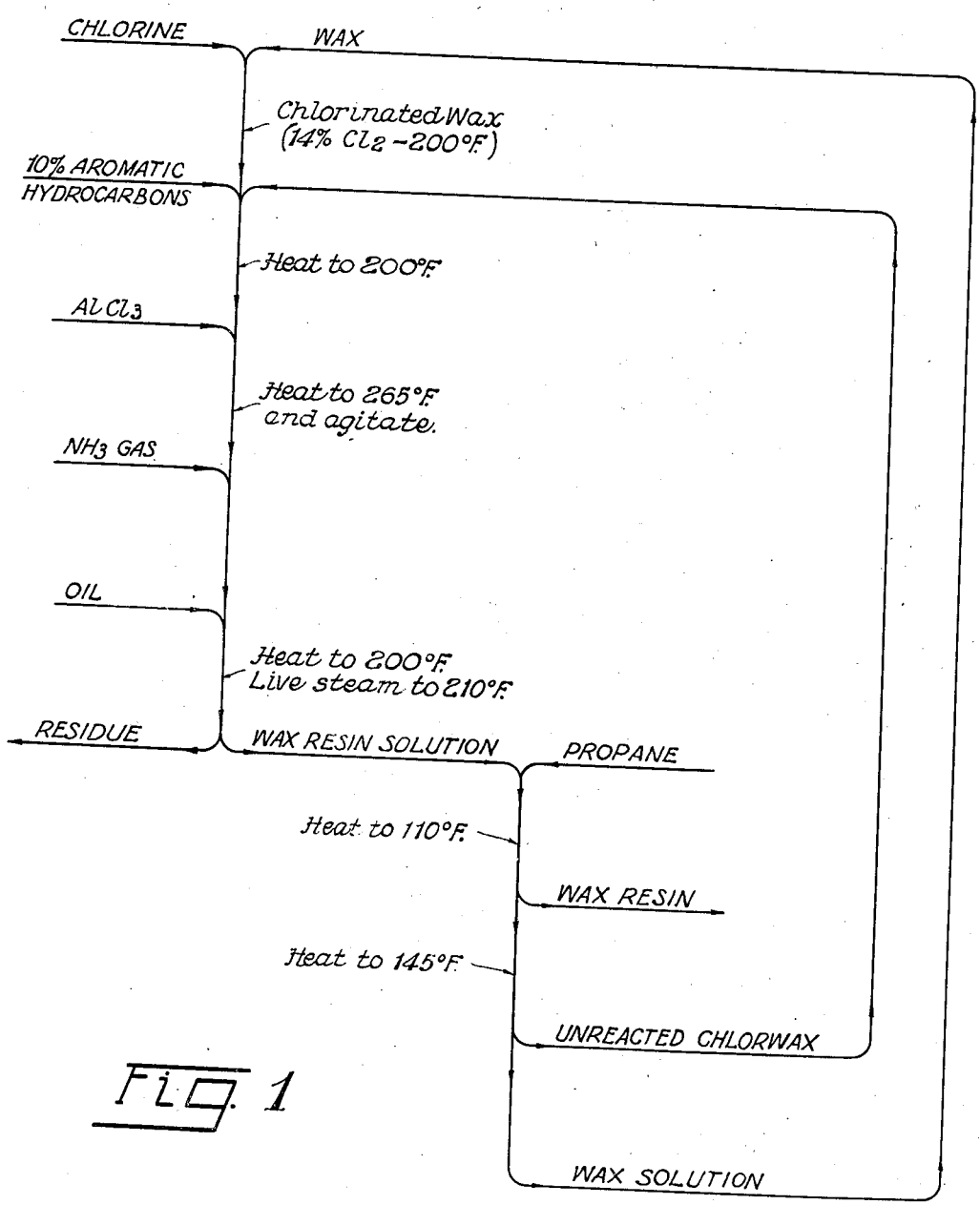

Patented Apr. 5, 1938

2,113,179

UNITED STATES PATENT OFFICE 2,113,179

MANUFACTURE OF POUR POINT DEPRESSORS

Webster B. Kay, Chicago, Ill., assignor to Standard Oil Company, Chicago, Ill., a corporation of Indiana Application December 29, 1934, Serial No. 759,729

6 Claims. (Cl. 87—9)

This invention relates to improvements in the preparation of pour point depressors, and particularly to improvements in the method of preparing pour point depressors of the condensation type obtained by the polymerization of paraffin hydrocarbons such as paraffin wax, and to condensation of chlorinated paraffin with aromatic hydrocarbons such as naphthalene in the presence of aluminum chloride.

Lubricating oils obtained from paraffin base crudes and/or mixed base crudes have comparatively high pour points, that is when tested by a standard method such as the A. S. T. M. method for cold test, they become solid at a comparatively high temperature, namely 25-40° F. above zero. In order to make such oils serviceable for winter use, it has been the practice to dewax such oils and/or to add to such oils such fatty acid soaps as are known to depress the cold test thereof. More recently it has been found that certain synthetic oils and resins prepared by the condensation in the presence of aluminum chloride, of chlorinated wax and an aromatic hydrocarbon, such as naphthalene may be added to the oil in an amount of from 0.1 to 5% to depress the pour point. Such pour point depressors have been introduced to the trade under the trade name of "Paraflow" and under the trade name of "Pourex" purported to be made under U. S. Patents 1,963,917 and 1,963,918. Although the pour point depressors prepared by the methods described in the above mentioned patents are effective in lowering the pour point of lubricating oils to which they are added, I have found that these pour point depressors contain constituents which lower the pour point of oils to a much greater extent than do the addition of the materials from which they are removed. I have found that certain hydrocarbons which behave as solvents of paraffin hydrocarbons are in fact precipitants of the more potent wax resin constituents of the condensation type pour point depressors.

I am aware that attempts have been made to purify synthetic wax resins of the type herein described by separating unreacted wax from the condensation products by precipitating the wax from solvent solutions at room temperatures and lower and separating the wax by filtration or other means. This requires the use of expensive cooling and filtering apparatus. My process of purifying the wax resin differs drastically from that of the prior art. Whereas the prior art teaches the separation of the unreacted wax from the wax resin by crystallization at temperatures in the neighborhood 20-40° F. below zero, my invention depends upon the insolubility of the constituents of the wax resin at elevated temperatures and upon the solubility of the unreacted waxes at these particular temperatures in the wax resin precipitants. I have discovered that the solubility of the more effective pour point depressing constituents of the wax resins in paraffin solvents decreases as the temperature of the solution is raised. I am able therefore by progressively raising the temperature above that at which complete solution is obtained in paraffin solvents to progressively precipitate from the solution constituents which are progressively less active as pour point depressors.

I have discovered that by treating the synthetic wax resins with liquefied normal gaseous hydrocarbons at elevated temperatures, particularly at temperatures above 100° F., a fractional precipitation of progressively less effective pour point depressors is obtained. When a synthetic wax resin pour point depressor, such as is obtained by the method disclosed in U. S. Patent 1,963,918, is mixed with a liquefied normal gaseous hydrocarbon such as propane, butane, isobutane and ethane or a mixture of these or of any two of these hydrocarbons and the temperature of the mixture is raised to about 110° F., a precipitate of active wax resin is obtained. When the temperature is further raised to about 145° F. a second precipitate is obtained of less active wax resins and the portion remaining soluble in the solution above 145° F. is found to be ineffective as a pour point depressor. I believe that the material obtained in the precipitate at 110° F. is completely condensed material. For that reason it is the most potent pour point depressor. The material precipitated from 110° F. to 145° F. is only partially condensed material, being mainly chlorinated paraffins, and the material soluble above 145° F. is the pure paraffin.

I have been able to obtain increased yields of pour point depressors by recirculating of the material precipitated at 145° F. and the material soluble in the solvent above 145° F.

Figure 2:
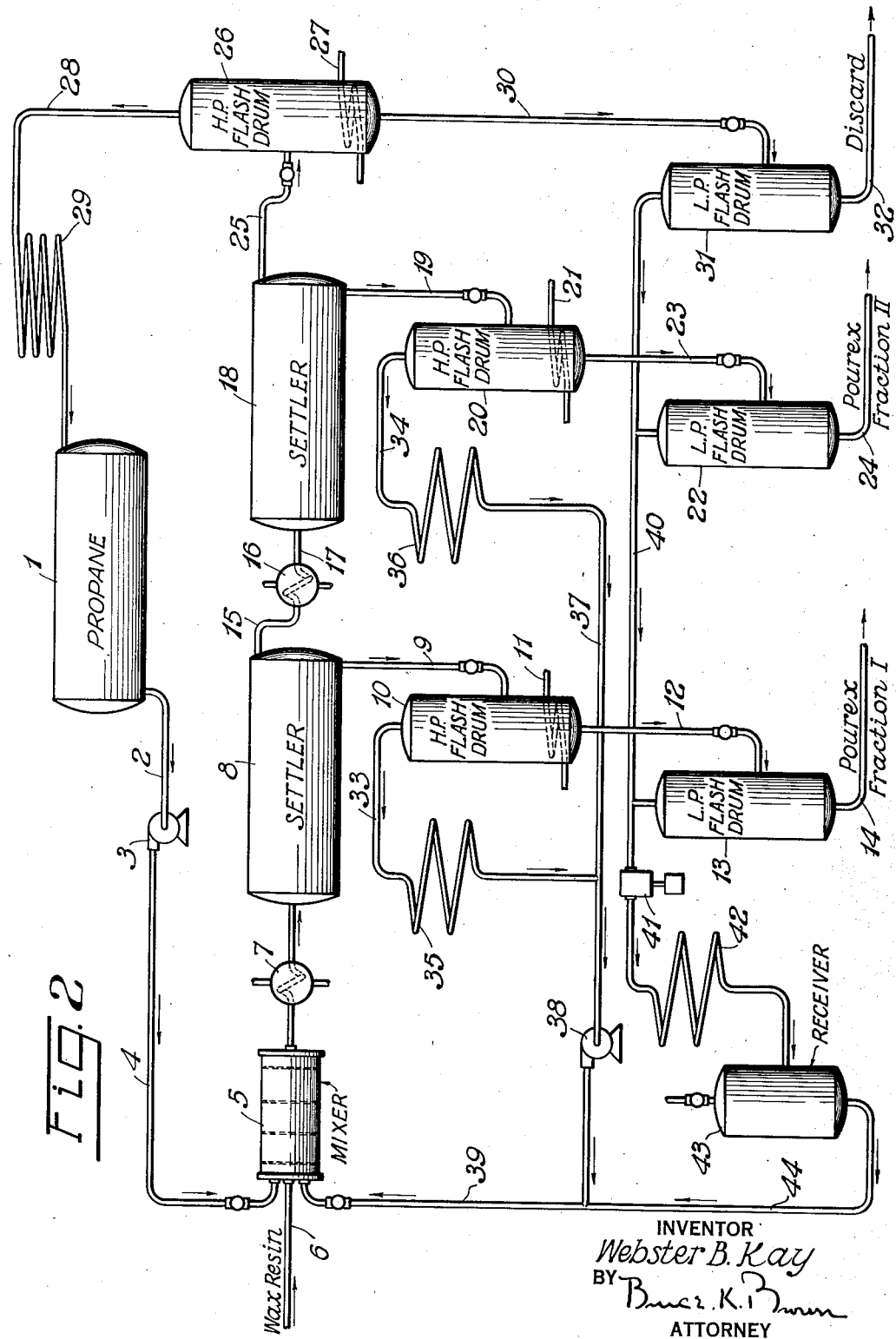

A complete understanding of my invention can be obtained from the following description thereof taken in conjunction with the accompanying drawings which form a part of this specification, in which Figure 1 is a flow diagram of my improved process; and Figure 2 is a diagrammatic elevational plan of a system for carrying out the process according to the present invention.

Referring to Figure 1, a wax such as paraffin, petrolatum, Montan wax, ozokerite wax etc., is chlorinated with chlorine at a temperature of about 200° F. until the wax contains about 14% chlorine. The resulting chlorinated wax is mixed with an aromatic hydrocarbon, such as naphthalene, anthracene, diphenyl, coal tar residues etc. and the mixture heated to about 200° F. Ten to fifteen per cent by weight of aluminum chloride is added in small quantities for a period of five to six hours, and the mixture heated to a temperature of about 265° F. with agitation for a period of about one hour. The reaction mixture is then cooled to about 200° F. and neutralized with excess ammonia gas. The neutralized reaction mixture is diluted to give a 20% solution of reaction material in a pale oil having a Saybolt universal viscosity of 150–250 seconds at 100° F. The diluted solution is then heated to about 200° F. by means of a closed steam coil, while being agitated with air, and subsequently heated by the introduction of live steam into the solution to a temperature of 210° F. After settling, the desirable wax resin solution is removed from the undesired precipitated residual material. The wax resin obtained at this point, is then brought into solution with liquefied propane at about room temperature and the mixture heated to a temperature of about 110° F., at which temperature a precipitate of wax resin is obtained. After removal of the precipitate, the mixture is further heated to about 145° F., at which temperature a precipitate of unreacted chlorwax is obtained. This precipitate comprises unreacted chlorwax and may be recirculated and mixed with the chlorwax and aromatic hydrocarbon undergoing condensation. The material remaining in solution at a temperature above 145° F. comprises substantially unchlorinated wax which I may recirculate after removal of the solvent, and unite with the wax undergoing chlorination.

The effectiveness of the fraction precipitated at 110° F. is illustrated by the following data which are presented merely by way of illustration. When the wax resin solution is mixed with approximately 5 volumes of liquefied propane at room temperature and the temperature thereof raised to 110° F. material representing about 51% by weight of the original wax resin is precipitated. Upon increasing the temperature to 145° F., material representing about 11% of the original wax resin is precipitated and about 38% by weight of the original wax resin remains in solution at a temperature above 145° F. When $\frac{1}{10}$% of the original wax resin is added to a pale filtered oil having a solid point +32° F., the solid point is reduced to about −7° F. When $\frac{1}{10}$% of the material precipitated at 110° F. is added to another portion of the same pale filtered oil, the solid point is decreased 42° so that the mixture has a solid point of about −12° F. When $\frac{1}{10}$% of the material precipitated at 145° F. is added to still another portion of the same pale filtered oil, the solid point of the oil is reduced only 5°, giving the mixture a solid point of +27° F., and when 0.10% of the fraction soluble above 145° F. is added to another portion of the same pale filtered oil, the solid point is reduced only 4° to +28° F. From the foregoing data, it is readily seen that the fraction precipitated at 110° F. contained substantially all of the effective pour point depressing constituents of the condensation product.

While the precipitation of the wax resin from the solvent may be accomplished in many ways, the following is a preferred embodiment of my invention:

Referring to Figure 2 of the accompanying drawings, liquefied propane from tank 1, passing thru line 2, pump 3, and line 4 is mixed at about room temperature in mixer 5 with condensed wax resins from a condensation process (not shown) introduced into mixer 5 thru line 6. The propane-wax resin mixture is agitated in mixer 5 until a complete solution is obtained. The wax resin propane solution is then passed thru heater 7 wherein it is heated to a temperature of about 110° F., and passed into settler 8, maintained at a temperature of about 110° F. and at a pressure of 300–700 lbs./sq. in., wherein a precipitate of the insoluble wax resin constituents is obtained. The precipitated material in settler 8 is removed therefrom thru valved line 9 and introduced into the high pressure flash drum 10 heated by means of steam coil 11, wherein the propane is flashed from the precipitated material and removed overhead as hereinafter detailed, and the substantially propane free residue is passed thru line 12 into the low pressure flash drum 13 wherein the remaining propane is flashed from the precipitated material and removed overhead as hereinafter explained. The now propane free material which was fractionated from the propane wax resin solution at 110° F. is removed from the low pressure flash drum 13 thru line 14 to storage means (not shown) in condition for use as a pour point depressor in oils for various purposes.

The propane solution of unprecipitated wax resins in settler 8 is removed therefrom thru line 15 and passed thru heater 16, wherein it is heated to a temperature of about 145° F., and passed thru line 17 into settler 18 maintained at a temperature of about 145° F., and a pressure of 300–700 lbs./sq. in. The material insoluble in propane under these conditions, which is chiefly unreacted chlorinated paraffin wax or chlorinated wax which has been only partially condensed, is precipitated in settler 18. It is removed from settler 18 thru valved line 19 and introduced into the high flash drum 20 heated by steam coil 21 wherein the major portion of the propane is removed by flash distillation and removed overhead as hereinafter described. The residue from high pressure flash drum 20, from which substantially all of the propane has been removed, is subsequently introduced into the low pressure flash drum 22 thru valved line 23, wherein the remaining propane is removed overhead as hereinafter explained, and the propane freed residue removed from the flash drum thru line 24. This material, which possesses very poor pour point depressing properties, may be used as such but is preferably returned to the condensation process (not shown) and mixed with the chlorinated wax being processed therein, as explained in the hereinbefore described Figure 1.

The soluble portion of the propane mixture in settler 18, which is substantially a paraffin solution of unreacted wax, is removed therefrom thru valved line 25 and introduced into the high flash drum 26 maintained at a temperature above 145° F., by means of steam coil 27 wherein the major portion of the propane is removed by flash distillation and removed overhead thru line 28, cooled in cooler 29 and returned to the liquefied propane storage tank 1. The residual wax in flash drum 26 is removed therefrom thru valved line 30 and introduced into the low pressure flash drum 31 wherein the remaining propane is removed from the wax and removed overhead as hereinafter detailed, and the residual wax removed thru line 32. The wax removed thru line 32 possesses no pour point depressing properties and may be discarded, but I prefer to return this wax to the condensation process (not shown) and to combine it with the wax undergoing chlorination. The propane removed overhead from high pressure flash drums 10 and 20 is removed overhead thru lines 33 and 34 respectively, cooled in condensers 35 and 36 respectively, and the cooled propane combined in line 37 and returned to the mixer 5 by means of pump 38 and line 39. The propane flashed in low pressure flash drums 13, 22, and 31 is removed overhead thru line 40 and compressed in compressor 41 from whence the compressed propane is passed thru cooler 42 into pressure receiver 43, from whence the liquefied propane is removed thru line 44 and combined with the propane from the high pressure flash drums in line 39 and returned to mixer 5.

Although in the foregoing process, I have used propane as a preferred solvent, I do not wish to be limited thereby. I may with equal success use other liquefied normally gaseous hydrocarbons such as ethane, isobutane, butane, cyclopropane or mixtures of these hydrocarbons. Different solvents will require the use of different operating conditions, but the proper proportions and temperatures for phase separation can easily be determined by simple preliminary tests. I prefer to use 4 to 8 volumes of liquid propane per volume of wax resin and to operate within the general temperature range of 110° F. to 200° F. and a pressure range of 150 to 800 pounds per square inch.

While I have described in detail the preferred embodiment of my invention, I do not limit myself to details hereinabove set forth except as defined by the following claims:

1. In the process of preparing a synthetic wax resin pour point depressor by the condensation of a mixture of chlorinated wax and an aromatic hydrocarbon in the presence of aluminum chloride, the improvement which comprises dissolving the crude wax resin in liquefied propane, heating the solution to a temperature of about 110° F. to 120° F. while maintaining the mixture under a pressure sufficient to keep the propane in liquid form, and separating the synthetic wax resins insoluble in said solvent at a temperature of about 110° F. to 120° F., which synthetic wax resins possess the most efficient pour point depressing properties.

2. In the process of preparing a synthetic wax resin pour point depressor by the condensation of a mixture of chlorinated wax and an aromatic hydrocarbon in the presence of aluminum chloride, the improvement which comprises dissolving the crude wax resin in liquefied propane, heating the solution to about 110° F. while maintaining a pressure sufficient to keep the propane in liquid form, whereby the solution separates into a solid phase comprising the synthetic wax resins which possess the most efficient pour point depressing properties, and a liquid phase comprising synthetic wax resins having relatively poorer pour point depressing properties than the synthetic wax resins in the solid phase, removing the synthetic wax resins which have the most efficient pour point depressing properties and which are insoluble in the solvent at about 110° F., heating the solution after such separation to about 145° F. while maintaining a pressure sufficient to keep the propane in liquid form, at which temperature there are precipitated synthetic wax resins which have relatively poorer pour point depressing properties than the synthetic wax resins insoluble in the solvent at a temperature of about 110° F. and removing the synthetic wax resins insoluble in the solvent at 145° F.

3. In the process of preparing a synthetic wax resin pour point depressor by the condensation of a mixture of chlorinated wax and an aromatic hydrocarbon in the presence of aluminum chloride, the improvement which comprises dissolving the crude wax resin in liquefied propane, heating the solution to about 110° F. while maintaining a pressure sufficient to keep the propane in liquid form, at which temperature the synthetic wax resins, which have the most effective pour point depressing properties, are insoluble, removing the synthetic wax resins insoluble in the solvent at about 110° F., heating the solution after such separation to about 145° F. while maintaining a pressure sufficient to keep the propane in liquid form, at which temperature there are precipitated synthetic wax resins which have relative poorer pour point depressing properties than the synthetic wax resins insoluble in the solvent at a temperature of about 110° F., and removing the synthetic wax resins insoluble in the solvent at about 145° F. and subsequently separating the solvent from the separated insoluble fractions.

4. In the process of preparing a synthetic wax resin pour point depressor by the condensation of a mixture of chlorinated wax and an aromatic hydrocarbon in the presence of aluminum chloride, the improvement which comprises dissolving the crude synthetic wax resin in liquefied propane, heating the solution to about 110° F. while maintaining a pressure sufficient to keep the propane in liquid form, at which temperature the synthetic wax resins, which have relatively greater pour point depressing properties, are separated from the solution, removing the effective synthetic wax resin pour point depressors insoluble in the solvent at a temperature of about 110° F. from the soluble constituents, heating the solution after the removal of the synthetic wax resins insoluble in the solution at a temperature of about 110° F. to a temperature of about 145° F. while maintaining a pressure sufficient to keep the propane in liquid form, at which temperature there are separated from the solution synthetic wax resins having relatively poorer pour point depressing properties than the synthetic wax resins separated at about 110° F., removing the synthetic wax resins insoluble at about 145° F. from the solution, removing the solvent from the synthetic wax resins separated at 110° F. and 145° F. respectively, returning the synthetic wax resins separated from the solution at about 145° F. to the mixture of chlorinated wax and aromatic hydrocarbons undergoing condensation, separating the solvent from the constituents of the material soluble in the solvent at a temperature above 145° F. and returning the same to the wax undergoing chlorination.

5. The process of preparing a synthetic wax resin pour point depressor which comprises chlorinating paraffin wax, mixing naphthalene with the chlorinated wax, condensing said mixture in the presence of aluminum chloride, neutralizing the condensed products with gaseous ammonia, diluting the neutralized condensation products with a pale oil, separating the crude synthetic wax resins from the undesirable reaction products, mixing the diluted crude synthetic wax resin with liquefied propane, heating the propane solution to about 110° F. while maintaining a pressure sufficient to keep the propane in liquid form, whereby the synthetic wax resins which have the most effective pour point depressing properties are precipitated, removing the said precipitate and separating the propane therefrom, heating the propane solution to about 145° F. after the removal of the synthetic wax resins insoluble at 110° F., while maintaining a pressure sufficient to keep the propane in liquid form, whereby a fraction is precipitated having relatively poorer pour point depressing properties than the fraction insoluble in propane at about 110° F., separating the fraction insoluble in propane solution at 145° F., removing the propane from said fraction and returning the propane-free fraction to the chlorinated wax and naphthalene mixture, removing the propane from the constituents having relatively no pour point depressing properties and which are soluble in propane at temperatures above 145° F. and returning the said propane-free constituents to the wax undergoing chlorination.

6. In the process of preparing a synthetic wax resin pour point depressor by the condensation of a mixture of chlorinated wax and an aromatic hydrocarbon in the presence of aluminum chloride, the improvement which comprises dissolving the wax resin in liquefied propane, heating the propane solution to about 110° F., passing the heated propane solution into a settling chamber maintained at about 110° F. and under a pressure of 300 to 700 lbs./sq. in. wherein synthetic wax resins having relatively greater pour point depressing properties are separated from the solution, separating the synthetic wax resins insoluble in propane at 110° F. from the solution, passing the insoluble synthetic wax resins into a high pressure flash drum wherein the occluded propane is distilled from the insoluble effective synthetic wax resin pour point depressants, passing the partially propane-free material into a low pressure flash drum wherein the remaining portion of the propane is removed from the said insoluble effective pour point depressants, passing the propane solution in the high pressure settler after removal of the synthetic wax resins insoluble in said propane solution at 110° F. through a heat exchanger wherein the temperature of said solution is raised to about 145° F., introducing said heated propane solution into a second high pressure settler maintained at a temperature of about 145° F. and under a pressure of about 300 to 700 lbs./sq. in. whereby there is precipitated a fraction which has relatively poorer pour point depressing properties than the synthetic wax resins separated at 110° F., removing the precipitated fraction from said second settler and passing the same into a high pressure flash chamber wherein a substantial portion of the propane is removed from the precipitate, passing the precipitate into a low pressure flash chamber wherein the remaining portion of the propane is removed from the precipitate, and removing the said propane-free precipitate to the chlorinated wax and naphthalene solution undergoing condensation, introducing the propane solution containing substantially unreacted wax which has substantially no pour point depressing properties and which is soluble in said solvent at temperatures above 145° F. into a high pressure flash chamber wherein the propane is removed from the soluble material, and returning the substantially unreacted wax to the wax undergoing chlorination.

WEBSTER B. KAY.